April 29, 1952  A. A. BIELICKI  2,595,048
ANNUNCIATOR FOR GAMES

Filed Jan. 17, 1949  3 Sheets-Sheet 1

Anthony A. Bielicki
INVENTOR.

April 29, 1952
A. A. BIELICKI
2,595,048
ANNUNCIATOR FOR GAMES
Filed Jan. 17, 1949
3 Sheets-Sheet 2
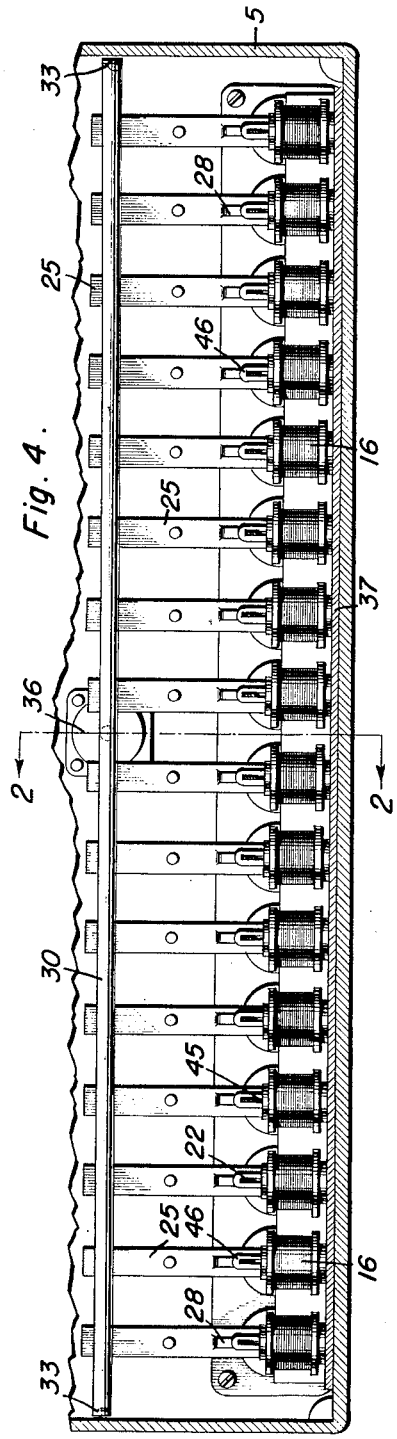
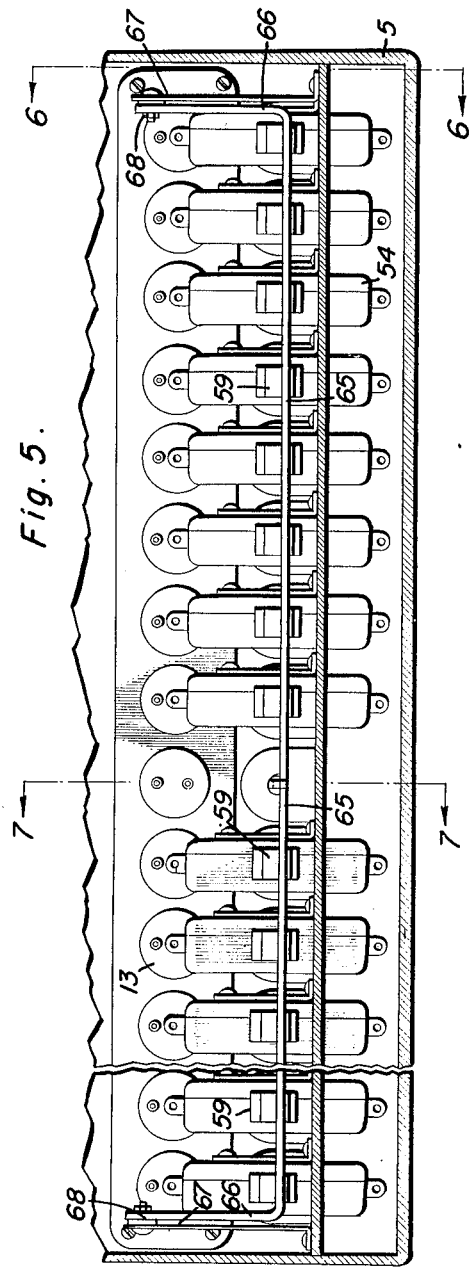
Anthony A. Bielicki
INVENTOR.
BY
*Clarence A. O'Brien*
*and Harvey B. Jacobson*
Attorneys April 29, 1952   A. A. BIELICKI   2,595,048
ANNUNCIATOR FOR GAMES
Filed Jan. 17, 1949

Anthony A. Bielicki
INVENTOR.

Patented Apr. 29, 1952

2,595,048

UNITED STATES PATENT OFFICE 2,595,048

ANNUNCIATOR FOR GAMES

Anthony A. Bielicki, Wilmington, Del.

Application January 17, 1949, Serial No. 71,293

8 Claims. (Cl. 177—384)

1

This is a continuation-in-part of my copending application Serial No. 792,035 which is now abandoned.

This invention relates to indicator boards for games, to annunciators for races, to game scoring apparatus and the like and it has for its main object to provide a simple and effective apparatus adapted to display rapidly a large number of figures, numbers or characters used in a game or to be recorded or displayed for any other purpose, and further adapted to cancel all the figures, numbers or characters displayed as speedily as possible at the given moment, thus making the apparatus ready for a new display of figures, numbers or characters and permitting a rapid progress of any game or annunciation in which this apparatus is used.

A further object of the invention consists in providing an apparatus of the type above mentioned which may be fixed and displayed on a wall and in which the display of a series of figures, numbers or characters and their cancellation is obtained by means of a series of push buttons pressed by an operator standing in front of the apparatus.

A further object of the invention consists in providing an apparatus for displaying or temporarily recording numbers, letters, figures, characters or the like, by means of an electric display light and by means of individual relays each adapted to operate a single display light, which relays are operated by an instantaneous impulse and are de-energized after the impulse, said relays operating switches which keep the operative circuits of the display lamps permanently energized in a position in which they are suddenly releasable, until actually released by a further electrically controlled action.

A further object of the invention consists in providing an apparatus for displaying or temporarily recording numbers, letters, figures, characters or the like, by means of electric display lights, the energization of which is controlled by individual electromagnetic devices or coils, each adapted to operate a single display light, said coils being operated by instantaneous impulses, such as the impulses produced by a short time pressing of a push button, the energization of a display light circuit being obtained by means of a switch of the change over or snap type adapted to remain in the position into which it has been brought, once it has been operated and operable by the said individual electromagnetic coils and by an electromagnetic device which they have in common and which returns all the switches at the same time into a position of rest, in which they are ready for further operation.

A further object of the invention consists in providing an apparatus for displaying and/or for temporarily recording numbers, figures, letters, characters and the like, by means of electric display lights, the energization of which is controlled by relays which are associated with them and which are operated by an instantaneous impulse, such as produced by a push button and which are de-energized after the reception of such an impulse, but which control a circuit by means of an armature and a mechanical locking device, adapted for mutually locking each other in their closed position, said armature controlling the display lamp circuits, and said locking device being operable and releasable by an electromagnetic resetting device which is in common to all the relays, armatures, and display lamps.

Still further objects will be apparent from the following detailed specification.

The invention is illustrated in the accompanying drawings showing two embodiments thereof. It will be understood however, that these embodiments are only shown by way of example, in order to explain the principle of the invention and the best mode of applying said principle. Modifications of the embodiments shown are therefore not necessarily departures from the essence of the invention.

In the drawing:

Figure 4 is an elevational front view of the interior of the apparatus, partly in section, the section being taken along line 4—4 of Figure 2.

Figure 5 is an elevational front view of the interior of a modification of the apparatus illustrated in Figures 1–4, partly in section, the section being taken along line 5—5 of Figure 6.

Figure 6:
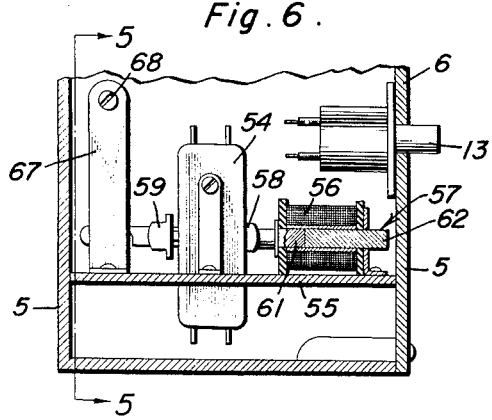
Figure 7:
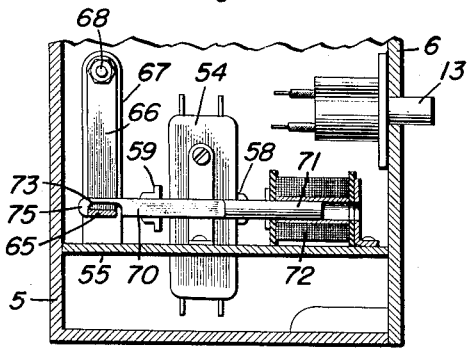

Figures 6 and 7 are conventional sectional side views of the modification of the apparatus shown in Figure 5, the sections being taken along lines 6—6, and 7—7 respectively, of Figure 5.

Figure 8:
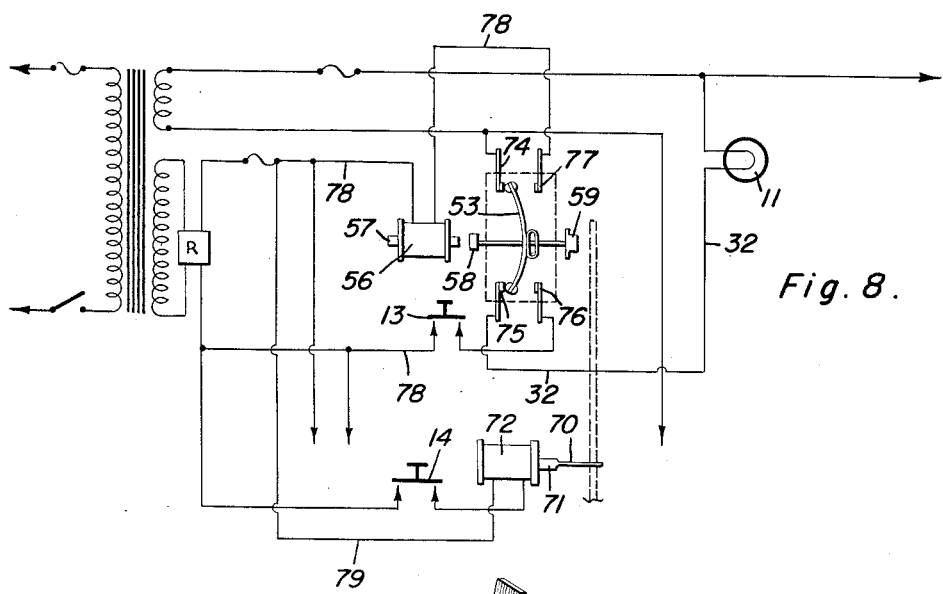

Figure 8 is a diagram of the connections of the apparatus shown in Figures 5–7.

Figures 9, 10:
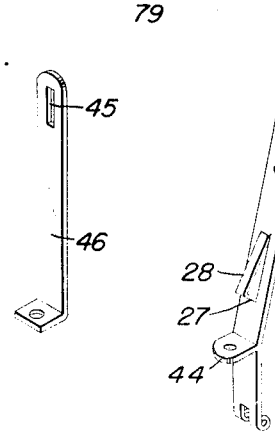
Figure 11:
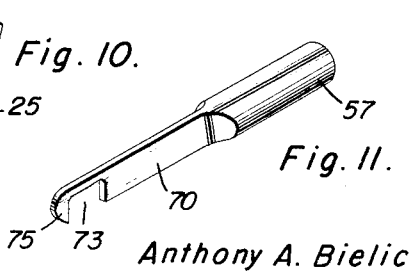

Figures 9, 10 and 11 are perspective views of details.

The indicator or annunciator apparatus, shown by way of example, is equipped for displaying numbers or characters to be recorded in rapid succession. The entire series of numbers or characters have to be erased a short time after they have been displayed. Such an operation is required in many games, for instance in the game called "Harrigan," in annunciators for races, scoring apparatus and similar devices.

It will however be understood that the particular significance of the display made by the apparatus is not material, provided that the operation calls for a rapid display and an instant erasing of all numbers or characters displayed to clear the field for the next series to be displayed.

The annunciator or indicator apparatus comprises a box 5 provided with a front wall 6 having a number of slots or windows 7, 8. The number of windows may be equal to the number of figures to be displayed or, as shown in the drawing, merely a small number of elongated arcuate or straight slots may be provided, subdivided into sections 9, each of which displays one of the figures used in the game. The slots may be covered with a pane 10 of transparent or semitransparent material on which the figures are inscribed in some conspicuous way. Behind each section a light bulb 11 is arranged which, when lit, clearly outlines the figure on display.

Below the display windows or slots 7, 8, a series of push button switches 13 is arranged containing buttons corresponding to each of the figures displayed. Moreover, a further push button switch 14 controls the resetting of the apparatus. A further switch 15 may be arranged to control the supply of power to the apparatus.

The circuits of the light bulbs 11 are not directly operated by the push button switches but are controlled by relays 16, each of which operates a switch 21. Each of said switches 21 consists of a resilient strip or switch blade 25 and of two pairs of contact springs 17, 18; and 19, 20. The contact springs 17 and 20 are linked or connected to the switch blade 25 by means of an insulating block or pin 26.

One of the pairs of contact springs 17, 18 is closed and the other pair 19, 20 is open when the switch blade is in its normal position and the relay 16 is de-energized. The closed pair is opened and the open pair is closed by the energization of the relay 16 and the operation of the switch 21. The pair of contact springs 17, 18 which is closed in the position of rest, controls the relay circuit 31 and therefore de-energizes the relay 16 immediately after its energization. The pair of contact springs 19, 20 which is closed upon energization of the relay 16 controls the circuit 32 of the lamp 11.

The relay 16 comprises the armature 22 which is under the tension of a spring 23 and which ends in a lock head 24. The armature is pivoted to a post 47 and is guided in a slot 45 of an upright or bracket 46 which limits its movement. The lock head of the armature cooperates with a catch or locking tooth 28 on the switch blade 25. The blade 25 may be of resilient material and in this case is fixedly mounted on the baseboard 37. However the blade may also be hinged to the base plate 37 as shown at 34 in Figure 2.

The locking tooth or catch 28 may be formed by a suitable projecting member 28 forming a step 27. The projection may be produced by cutting out a tongue from the switch blade and by bending it so that it occupies the proper position on the switch blade as shown in Figure 10. The step 27 which is thus produced is adapted to lock the armature 22 when it has been brought into a suitable position by the energization of the relay 16.

The switch blade 25 is moreover provided with a projection 44 to which a spring 29 is attached. This spring is also attached to the base plate 37 and, when tensioned, it draws the switch blade towards the relay armature.

The upwardly projecting tongues of the switch blades 25 of the relays 16 are all aligned on the base plate 37 and their ends, therefore, form a row, as seen in Figure 4. In front of said row of switch blades 25 a reset bar 30 is arranged which may or may not be provided with guides 33 at its ends. The guides 33 may be formed by the bent ends of the bars and may be provided with slots (not shown) through which pins mounted in the side walls of the casing project.

The reset bar 30 is fixedly connected with the core 26 of a solenoid 36. If the number of relays and switches 21 is large, a plurality of solenoids 36 may be arranged operating simultaneously to secure a uniform movement of the reset bar 30. The reset bar is located immediately in front of the ends of the switch blades.

The solenoid core 26 is pushed outwardly by means of a spring 38. Upon energization of the solenoid, the core is moved inwardly against the action of the spring and the reset bar 30 presses on the switch blades 25 and moves them away from the relay 16. The solenoid 36 is energized by means of a circuit 39 containing the reset button 14.

When operated on a A. C. network the apparatus may be provided with a transformer 40 for stepping down the voltage supplied and in such a case the solenoid and the relay must be equipped for A. C. energization. Alternatively a rectifier R as indicated in the drawing may be used in the supply circuit.

Figure 3:
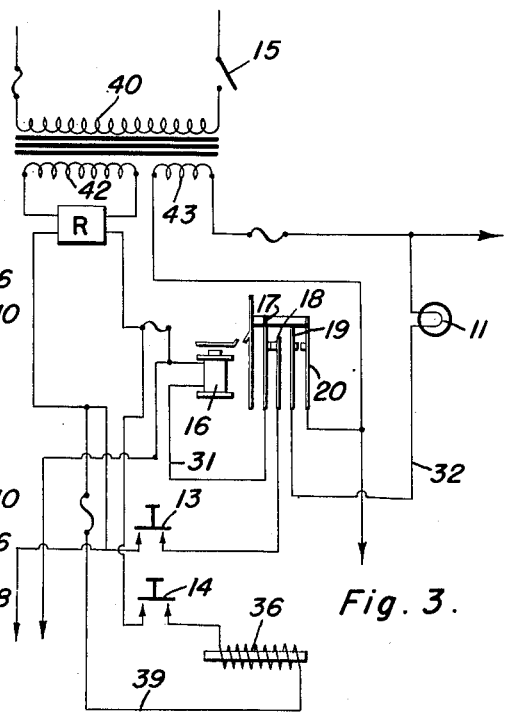
Figure 3 is a diagram of the connections of the apparatus illustrated in Figures 2 and 4.

The operation will be clearly understood by referring to Figures 3 and 4.

Figure 1:
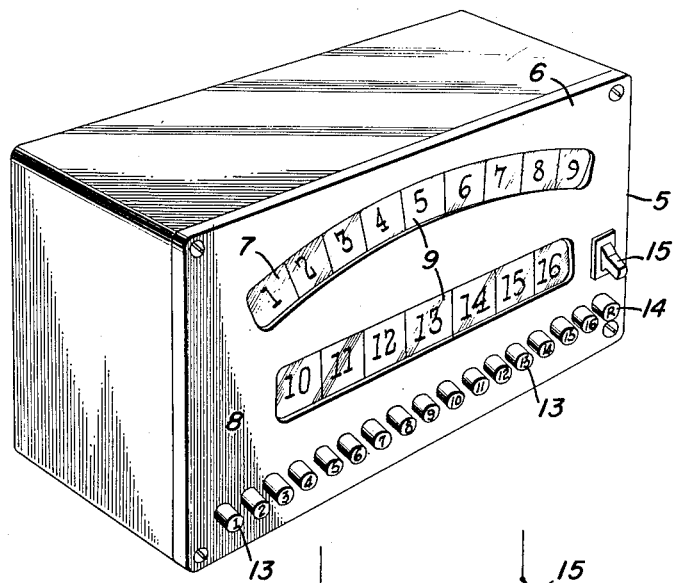
Figure 1 is a perspective view of the apparatus.
Figure 2:
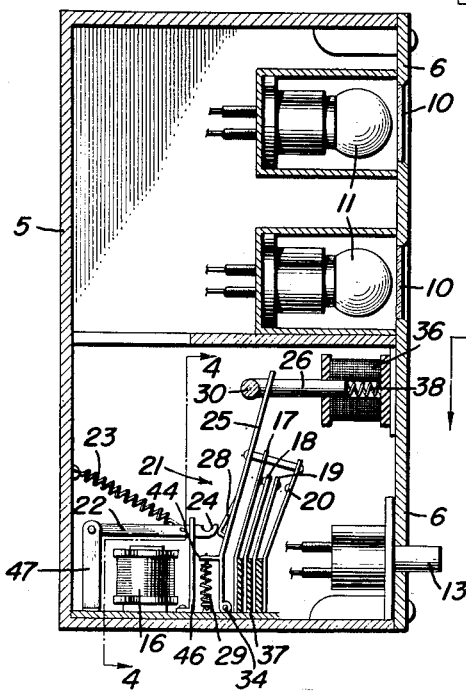
Figure 2 is a sectional elevational view of the said apparatus, the section being taken along line 2—2 of Figure 4.

In the position of rest the switch blade 25 is held in the position shown in Figure 2 by the locking head 24 of the armature 22 of relay 16 which in the position of rest, is applied against the tooth 28. Therefore, contact springs 17, 18 are closed and contact springs 19, 20 are opened. The spring 29 is somewhat tensioned in this position.

When a button switch 13 corresponding to a desired number is pressed, the relay 16 is operated, the armature 22 is moved downwardly towards the relay coil and the head 24 is moved into a position below the step 27 of the locking tooth 28. The switch blade 25 which was held by the head 24 of the armature 22 therefore moves toward the relay under the influence of spring 29 and thereby locks the armature 22, as the locking tooth or catch 28 now holds the armature and prevents it from returning into its original position under the influence of the spring 23. The movement of the blade 25 separates the contact springs 17, 18 and closes the contact springs 19 and 20. The former contact springs open the relay circuit 31 so that the relay 16 is deenergized, its armature remaining however locked for the time being as above described. The circuit 32 of the light bulb 11 is closed by the closing of the pair of contact springs 19, 20 and remains closed after the de-energization of the relay on account of the locking of the switch blade 25. The light bulb corresponding to the button switch which has been pressed therefore lights up and remains lighted, illuminating its sector or window 9.

As many light bulbs as necessary may be lighted in succession. They all remain in this condition until the button switch 14 is operated. Pressing of the button switch 14 energizes the resetting solenoid 36. The inward movement of the core 26 operates the resetting bar 30 which draws all the switch blades 25 away from their armatures 22 and their locker heads 24 so that the switch blades may return into their original positions against the action of springs 29 which are tensioned by this inward movement. When the armatures 22 return into their position of rest they again hold the switch blades 25 in the position shown in the figure in which the contact springs 17, 18 are closed and the contact springs 19, 20 are opened, thereby de-energizing the light bulb circuits.

The apparatus is now ready for further operation.

A further, preferred modification of the apparatus is shown in Figures 5 to 8. In this modification only solenoids are used. The modification comprises the casing 15 with slots 7 and 8 on the front wall 6 and windows 9 which are similar to those already described in connection with the modification shown in Figures 1 to 4. Likewise light bulbs 11 illuminating the windows and light bulbs circuits 32 for them, push button switches 13 and a reset button switch 14 of the type described above are arranged.

The light bulb circuits in this case are controlled by a switch 54 of a type which is marketed for instance under the name of "Interlock Switch" and which comprises a snap member 53 consisting of a double spring in which one of the two springs forming the double spring is provided with a loop. At their outer ends the two springs of the double spring are joined and carry contacts which are adapted to cooperate alternatively with two pairs of contacts facing each other. The snap member 53 is adapted to bridge the contacts and it snaps from one position bridging one pair of contacts into a second position bridging the other pair of contacts. The switch is operated by two buttons 58, 59 which are aligned and which are adapted to press on the double spring snap member from two sides in opposite directions. Pressing of a button throws the snap member from one position into the other position.

As the construction is not part of this invention and as the switch is a product which is actually on sale the switch is only indicated diagrammatically in Figure 8 of the drawings, and is merely indicated in outline in Figures 6 and 7.

One switch 54 of the type above described is mounted on an intermediate bottom plate 55 for each light bulb. In front of the switch a solenoid 56 is preferably mounted which is provided with a core 57 consisting partly of steel and partly of brass. This core is so mounted that when in a position of rest it is in contact with the button 58. In this position the brass portion 61 is located in the interior of the solenoid coil while part of the steel portion 62 of the core protrudes.

Behind the buttons 59, at some distance therefrom, a transverse bar 65 is arranged which is pivotally suspended within the casing by means of arms 66 pivoted to brackets 67, mounted on the intermediate bottom plate 55. The pivots 68 are preferably arranged near the top of the brackets 67 and above the resetting bar 65 so that the said bar will be turned into its position of rest by gravity. The pivots 68 and arms 66 are however so arranged that, when the resetting bar is swung out, it will press on all the buttons 59 of the switches 54 thereby causing the switches to operate.

In order to operate the resetting bar a hook member 70 is provided which forms the extension of the solenoid core 71 operated by a resetting solenoid 72. The hook member is provided with a cut 73 near the end 75 of the member which cut accommodates the resetting bar 65 with some spare room so as to permit relative movement of the bar within the cut. The hook like end 75 of the member draws the resetting bar 65 towards the switches 54 when the solenoid 72 is energized and the hooked member is drawn towards the said solenoid.

In all other respects the modification shown in Figures 5–8 is similar to that shown in Figures 1–4.

In the modification described it is possible to eliminate the push button switches 13 and the solenoids 56 and to operate the buttons 58 directly by hand or by means of a push rod operated by hand. It is however preferred to use an absolutely regular and uniform way of operating the "interlock" switches as these switches may get out of order when handled roughly.

The operation of this modification is the following:

In the position of rest the snap members of the switches 54 rest on contacts 77, 76 and the button 58 is pushed outwardly and rests against the core 57. When a push button switch 13 is operated by the attendant, the solenoid 56 is energized over a circuit 78 which includes contacts 77, 76 of switch 54. The solenoid is energized and moves its core towards the button 58 and presses the said botton. The snap member of the switch now changes its position and bridges contacts 74 and 75, as shown in Figure 8. Thereby the circuit of the light bulb 11 is closed over the said contacts 74, 75, while simultaneously the solenoid 56 is de-energized. This operation may be repeated with light bulbs illuminating other characters.

For resetting the apparatus the button switch 14 is pressed thereby energizing circuit 79 of the solenoid 72. The core 71 of the solenoid and the hook member 70 is thereby moved to the right in Figure 7. The hooked end 75 engages the reset bar 65 and presses it against the button 59 thus operating the switch which returns into the position in which the member 53 engages contacts 77 and 76. The circuits 32 of the light bulbs are all cut off and the switch is again in position for operation.

It will be clear that changes of an unessential nature may be made without departing from the essence of the invention.

Having described the invention, what is claimed as new is:

1. An annunciator for games comprising a casing with windows, each displaying a character; an illuminating means for each of the windows, adapted to display said character, an energizing circuit for each of said illuminating means, a mechanically operated snap switch in each of the energizing circuits with a plurality of contact pairs, provided with a switch member adapted to occupy two switching positions and subjected to elastic tension, said member controlling the contact between the aforesaid contact pairs, one of said contact pairs being open and the other being closed in each position, all of said switch members and switches being aligned, mechanical means for producing a mechanical action on said member in two opposite directions, said mechanical means including individual mechanical means for producing action in one direction and a common mechanical means for producing action on all the aligned switch members simultaneously in the other direction, the said individual mechanical means and the common mechanical means being arranged on opposite sides of the switch member, electromagnetic devices for operating each of said individual mechanical means for producing a movement of the switch member in one direction, said movement closing the contact pairs controlling the energizing circuit of the illuminating means, and a further electromagnetic device operating the common mechanical means for resetting all the switches into their original positions, energizing circuits for the said electromagnetic devices, the energizing circuits for the electromagnetic devices operating said individual mechanical means being controlled by one of the contact pairs associated with the allotted snap switches and being opened when the illumination circuit controlling pair is closed and being closed when the last-named pair is opened, manually controlled switches in each of said energizing circuits for the devices operating said individual mechanical means and a manually controlled energizing circuit for the electromagnetic device operating the common mechanical means, producing a simultaneous resetting movement of all the switch members.

2. An annunciator for games comprising a casing with windows, each displaying a character, an illuminating means for each of said windows adapted to display said character, an energizing circuit for each of said illuminating means, a mechanically operated snap switch in each energizing circuit having an elastic circuit closing member, adapted to occupy two positions and moved from one position into the other upon mechanical pressure exerted on said elastic member against increasing elastic resistance, said elastic circuit closing member being held in each position by the elastic forces of the switch member to be overcome upon movement from this position, the energizing circuit for the illuminating means being closed by said snap switch member in one of its positions and opened in the second position, a pushing element for each individual snap switch adapted to exert pressure on said switching element, a common pushing element for all the snap switches exercising pressure on all elastic members of the switches simultaneously, a solenoid for actuating each individual switch pushing element, an energizing circuit for the same, an individual push button switch for controlling the aforesaid energizing circuit of each solenoid, said energizing circuit being further controlled by the snap switch and closed when the said snap switch is in the position in which the energizing circuit of the illuminating means is opened, and a further solenoid for operating the common pushing element pressing on all the snap switches simultaneously, and a separate hand control energizing circuit for the last-mentioned solenoid.

3. An annunciator for games comprising a casing with windows, each displaying a character, an illuminating means behind each of said windows for displaying said character, an energizing circuit for each of said illuminating means, a mechanically operated snap switch in each energizing circuit, said snap switch having a plurality of contact pairs and being provided with an elastic, circuit controlling switch member adapted to occupy two switching positions and controlling said contact pairs, one of the contact pairs being opened and the other contact pair being closed in each position, said elastic circuit controlling switch member being under decreased elastic tension in each of the two contact making positions while passing through a phase of increased elastic tension when moved from each position toward the other position, means for applying a mechanical pressure on said elastic member and for moving it against increasing elastic tension, arranged on opposite sides of the said elastic member, the means arranged on opposite sides being adapted to apply pressure in opposite directions, and all said pressure applying means arranged on one side being aligned, an operating means for said pressure applying means, including rectilinearly moved pushing members, the pushing members on one side of the elastic member acting individually on each of said elastic switch members, the pushing member on the opposite side being a common member cooperating with the aligned pressure applying members of one side of all the snap switches controlling the illuminating devices and their energizing circuits, a solenoid for operating each of said individually acting pushing members, a manually controlled energizing circuit for each of said solenoids, each of the circuits being further controlled by one contact pair of the snap switch, the other contact pair controlling the energizing circuit of the illuminating means, the two contact pairs being closed and opened alternatively, a further solenoid operating the common pushing member, and a further separate energizing circuit with a manually controlled switch for said further solenoid.

4. An annunciator for games as claimed in claim 2 wherein the pushing member for each individually operated switches comprises a solenoid core arranged within one of the solenoids with its axis in the direction of the rectilinear movement.

5. An annunciator for games as claimed in claim 2 in which all the snap switches are arranged in a straight line with aligned pressure applying members and in which the common pushing member consists of a movable reset bar applied against said push members.

6. An annunciator for games as claimed in claim 2 in which all the switches are arranged in a straight line with aligned pressure applying members, and in which the common pushing member consists of a reset bar adapted to be applied against all the aligned pressure applying members, lateral arms on said bar brackets for suspending said bar on said arms pivotally, a hooked member adapted to be moved at right angle to the bar and engaging the same when moved, the further solenoid operating the said hooked member.

7. An annunciator for games as claimed in claim 1, wherein the electromagnetic device controlling each switch individually consists in a relay having an armature moving the switch member under elastic tension and locking it, when moved into one of its positions.

8. An annunciator for games as claimed in claim 1 wherein the elastic member of each switch consists of a switch blade with a freely projecting end and a wedge like stepped cam, and wherein the electromagnetic device is provided with an armature bearing against said cam and moving said elastic member upon energization of the relay and locking said member by engaging its stepped part after operation, and wherein the reset bar is applied against the freely projecting ends of the switch blades.

ANTHONY A. BIELICKI.

REFERENCES CITED

The following references are of record in the file of this patent:

UNITED STATES PATENTS

| Number | Name | Date |
|---|---|---|
| 1,116,007 | Burns et al. | Nov. 3, 1914 |
| 2,081,822 | Kimbell | May 25, 1937 |

FOREIGN PATENTS

| Number | Country | Date |
|---|---|---|
| 108,213 | Great Britain | Aug. 2, 1917 |